(12) United States Patent
Yokoyama

(10) Patent No.: US 9,729,724 B2
(45) Date of Patent: Aug. 8, 2017

(54) COMMUNICATION SYSTEM, RELAY DEVICE, AND INFORMATION PROCESSING DEVICE

(71) Applicant: Atsushi Yokoyama, Kanagawa (JP)

(72) Inventor: Atsushi Yokoyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/220,952

(22) Filed: Jul. 27, 2016

(65) Prior Publication Data

US 2017/0041468 A1 Feb. 9, 2017

(30) Foreign Application Priority Data

Aug. 4, 2015 (JP) ................................. 2015-154468
May 24, 2016 (JP) ................................. 2016-103298

(51) Int. Cl.
*H04M 3/42* (2006.01)
*H04M 7/00* (2006.01)
(Continued)

(52) U.S. Cl.
CPC ............. *H04M 3/567* (2013.01); *H04M 3/56* (2013.01); *H04M 15/8072* (2013.01);
(Continued)

(58) Field of Classification Search
CPC ....... H04M 1/274575; H04M 1/72586; H04M 2203/60; H04M 2203/2072;
(Continued)

(56) References Cited

U.S. PATENT DOCUMENTS 7,218,643 B1 * 5/2007 Saito ...................... H04H 20/02
370/395.52
7,853,242 B2 * 12/2010 Lewis ................... H04W 12/06
455/411
(Continued)

FOREIGN PATENT DOCUMENTS

JP 4954207 3/2012
JP 2013-175059 9/2013
(Continued)

*Primary Examiner* — Khai N Nguyen
(74) *Attorney, Agent, or Firm* — Cooper & Dunham LLP

(57) ABSTRACT

A communication system includes: a relay device including: a storage unit configured to store terminal specification information for specifying the third terminal associated with the second terminal, and a first communication control unit configured to connect the third terminal to the first network if an authentication control unit authenticates the terminal authentication information; one or more first terminals connected to a first network; a second terminal connectable to the first network and including a second communication control unit configured to transmit the relay-device specification information and the terminal authentication information to the third terminal through the second network if receiving the relay-device specification information and the terminal authentication information from the relay device; and a third terminal connectable to a second network and including a third communication control unit configured to transmit the terminal authentication information to the relay device through the second network.

16 Claims, 6 Drawing Sheets

(51) Int. Cl.
*H04M 1/56* (2006.01)
*H04M 15/06* (2006.01)
*H04M 3/56* (2006.01)
*H04M 15/00* (2006.01)

(52) U.S. Cl.
CPC ..... *H04M 2203/5018* (2013.01); *H04M 2203/60* (2013.01); *H04M 2207/18* (2013.01)

(58) Field of Classification Search
CPC . H04M 2203/2094; H04M 2203/5054; H04M 2242/30; H04M 2250/62; H04M 3/42; H04M 3/4234; H04M 3/42221; H04M 3/42246; H04M 3/42348; H04M 3/42357; H04M 3/42374; H04M 3/4931; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04M 7/1235; H04L 12/18; H04L 12/1813; H04L 12/581; H04L 47/78; H04L 47/80; H04L 51/04; H04L 63/10; H04L 63/104; H04L 63/107; H04L 65/1053; H04L 65/403; H04L 67/18; H04L 67/24; H04W 12/08; H04W 4/02; H04W 4/06; H04W 4/08
USPC .......... 379/90.01, 93.01, 93.21, 157, 158, 379/201.01, 202.01, 207.01; 370/259, 370/260, 261, 262; 455/411, 414.1, 416, 455/566; 709/225
See application file for complete search history.

(56) References Cited

U.S. PATENT DOCUMENTS

| | | | |
|---|---|---|---|
| 8,194,537 B2* | 6/2012 | Nomi | H04L 29/12301 370/219 |
| 8,307,200 B2* | 11/2012 | Tanizawa | H04L 9/32 709/223 |
| 8,743,781 B2* | 6/2014 | Chaturvedi | H04L 67/104 370/328 |
| 8,862,178 B2* | 10/2014 | Krishnaswamy | H04W 8/26 370/255 |
| 8,910,248 B2* | 12/2014 | Higuchi | H04L 49/354 370/254 |
| 9,124,501 B2 | 9/2015 | Yokoyama et al. | |
| 2002/0143922 A1* | 10/2002 | Tanimoto | H04L 29/06 709/223 |
| 2003/0139910 A1* | 7/2003 | Yamamoto | H04L 63/08 702/188 |
| 2005/0004991 A1 | 1/2005 | Yokoyama | |
| 2007/0011233 A1 | 1/2007 | Manion et al. | |
| 2007/0201511 A1* | 8/2007 | Saito | H04H 20/02 370/466 |
| 2008/0120394 A1 | 5/2008 | Yokoyama et al. | |
| 2011/0057971 A1 | 3/2011 | Yokoyama et al. | |
| 2011/0302401 A1 | 12/2011 | Yokoyama et al. | |
| 2012/0084840 A1* | 4/2012 | Higuchi | H04L 49/354 726/4 |
| 2013/0031393 A1 | 1/2013 | Yokoyama | |
| 2013/0227015 A1* | 8/2013 | Mihara | G06F 17/30194 709/204 |
| 2014/0267567 A1 | 9/2014 | Mihara et al. | |
| 2014/0289531 A1* | 9/2014 | Yamakawa | H04L 9/3263 713/176 |
| 2015/0095411 A1* | 4/2015 | Okumura | H04L 67/06 709/203 |
| 2015/0220480 A1 | 8/2015 | Mihara et al. | |
| 2015/0222734 A1* | 8/2015 | Inada | H04L 12/4633 370/315 |
| 2015/0271668 A1* | 9/2015 | Sun | H04W 12/04 455/411 |
| 2016/0192189 A1* | 6/2016 | Metke | H04W 12/06 455/411 |
| 2016/0192230 A1* | 6/2016 | Metke | H04W 28/021 370/338 |

FOREIGN PATENT DOCUMENTS

| | | |
|---|---|---|
| JP | 2013-191075 | 9/2013 |
| JP | 2014-075781 | 4/2014 |
| JP | 2014-176002 | 9/2014 |

* cited by examiner

COMMUNICATION SYSTEM, RELAY DEVICE, AND INFORMATION PROCESSING DEVICE

CROSS-REFERENCE TO RELATED APPLICATIONS

The present application claims priority under 35 U.S.C. §119 to Japanese Patent Application No. 2015-154468, filed Aug. 4, 2015 and Japanese Patent Application No. 2016-103298, filed May 24, 2016. The contents of which are incorporated herein by reference in their entirety.

BACKGROUND OF THE INVENTION

1. Field of the Invention

The present invention relates to a communication device, a relay device, and an information processing device.

2. Description of the Related Art

A meeting system has been conventionally known, in which some devices such as smart devices and personal computers are connected to office devices such as a multi-function peripheral (MFP), a printer, a projector, and an electronic whiteboard to securely conduct a meeting among limited devices.

Japanese Patent No. 4954207 discloses an invention related to a method of participating in a conference conducted via a peer-to-peer network, in which a conference organizer issues conference records and a participant can participate in a necessary conference by searching for the conference to participate from a list of conference records.

In the conventional technology, however, secure communication cannot be established more easily between a device placed in a location where a meeting is held and a device, such as a device of a home-based worker, not placed in the location where the meeting is held.

SUMMARY OF THE INVENTION

According to one aspect of the present invention, a communication system includes a relay device, one or more first terminals, a second terminal, and a third terminal. The relay device is configured to control communication of a first network. The one or more first terminals are connected to the first network. The second terminal is connectable to the first network. The third terminal is connectable to a second network. The relay device includes a storage unit, a transmission unit, an authentication control unit, and a first communication control unit. The storage unit is configured to store terminal specification information for specifying the third terminal associated with the second terminal. The transmission unit is configured to transmit relay-device specification information for specifying the relay device and terminal authentication information of the third terminal to the second terminal through the first network. The authentication control unit is configured to authenticate the terminal authentication information received from the third terminal through the second network. The first communication control unit is configured to connect the third terminal to the first network if the authentication control unit authenticates the terminal authentication information. The second terminal includes a second communication control unit configured to transmit the relay-device specification information and the terminal authentication information to the third terminal through the second network if receiving the relay-device specification information and the terminal authentication information from the relay device. The third terminal includes a third communication control unit configured to transmit the terminal authentication information to the relay device specified by the relay-device specification information through the second network.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
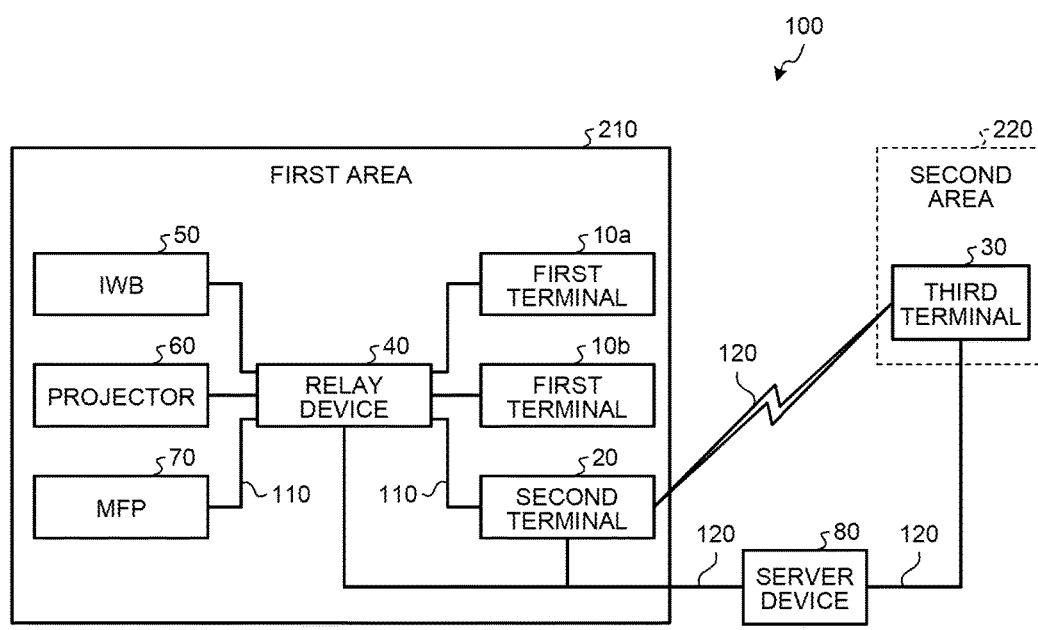
FIG. 1 is a diagram illustrating an example of a device configuration of a communication system according to some embodiments.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the communication system, the relay device, and the information processing device will be explained in detail below with reference to the accompanying drawings.

An embodiment has an object to provide a communication system capable of establishing secure communication more easily between a device placed in a location where a meeting is held and a device, such as a device of a home-based worker, not placed in the location where the meeting is held.

An example of the configuration of the communication system according to the embodiments will be explained first.

FIG. 1 is a diagram illustrating an example of a device configuration of a communication system 100 according to the embodiments. The communication system 100 according to the embodiments includes a first terminal 10a, a first terminal 10b, a second terminal 20, a third terminal 30, a relay device 40, an interactive whiteboard (IWB) 50, a projector 60, a multifunction peripheral (MFP) 70, and a server device 80.

The first terminal 10a, the first terminal 10b, the second terminal 20, the relay device 40, the IWB 50, the projector 60, and the MFP 70 are placed in a first area 210. The first area 210 is, for example, a company meeting room. The third terminal 30 is placed in a second area 220. The second area 220 is, for example, a user's home of the third terminal 30.

The first terminal 10a, the first terminal 10b, the second terminal 20, the relay device 40, the IWB 50, the projector 60, and the MFP 70 are connected to each other via a first network 110.

The communication of the first network 110 is controlled by the relay device 40. A communication scheme of the first network 110 may be a wired scheme or a wireless scheme. The embodiments will explain a case in which the first network 110 is a wireless local area network (wireless LAN).

The second terminal 20 and the third terminal 30 are connected to each other via a second network 120. The server device 80 is located in the second network 120. The communication scheme of the second network 120 may be a wired scheme or a wireless scheme. The second network 120 is, for example, an optical line and a mobile phone network.

The first terminal 10a and the first terminal 10b are internal terminals used by users in the first area 210. The first terminal 10a and the first terminal 10b are, for example, a personal computer, a tablet device, and a smartphone. In the following, when the first terminal 10a and the first terminal 10b are not discriminated from each other, either one or both of the first terminal 10a and the first terminal 10b is simply called "first terminal(s) 10". The number of the first terminals 10 may be an arbitrary number instead of two units.

The second terminal 20 is an information processing device capable of transmitting/receiving information to/from the relay device 40 when the second terminal 20 is in the same area as the relay device 40. The transmission and reception of information are performed through the first network 110 (wireless LAN), short-range wireless communication, and reading of code information. The communication scheme of the short-range wireless communication may be an arbitrary one. The communication scheme of the short-range wireless communication is, for example, Near Field Communication (NFC) and Bluetooth (registered trademark) Low Energy (BLE). The second terminal 20 is, for example, a tablet device and a smartphone. The code information is displayed on a liquid crystal panel of the relay device 40 or the like. The code information is, for example, a Quick Response Code (QR code) (registered trademark).

The third terminal 30 is an external terminal used by a user in the second area 220. The third terminal 30 is, for example, a personal computer, a tablet device, and a smartphone. The third terminal 30 communicates with the relay device 40 to connect to the first network 110. Hereinafter, a communication scheme in which the third terminal 30 communicates with the relay device 40 through the second terminal 20 is called "direct scheme". A communication scheme in which the third terminal 30 communicates with the relay device 40 without using the second terminal 20 is called "indirect scheme".

The relay device 40 is a device that controls the communication of the first network 110. When the communication scheme of the first network 110 is the wireless scheme, the relay device 40 is, for example, a wireless LAN router. The relay device 40 may be a device having a server function for implementing a meeting system. In this case, the relay device 40 also stores, for example, a meeting number for specifying a meeting.

The IWB 50 is an electronic whiteboard capable of display and writing of information. The projector 60 is a device that projects information input from the first terminal 10 or the like. The MFP 70 is a device having a copy function, a print function, a scanner function, and a FAX function.

The server device 80 is a device that performs transmission/reception of information between the second terminal 20 and the third terminal 30 and performs transmission/reception of information between the relay device 40 and the third terminal 30. The server device 80 has, for example, a mail server function and a file server function. When the server device 80 is used as a file server, it is possible to implement more secure communication by uploading and downloading information on the server device 80.

An example of a configuration of the first terminal 10 according to the embodiments will be explained next.

Figure 2:
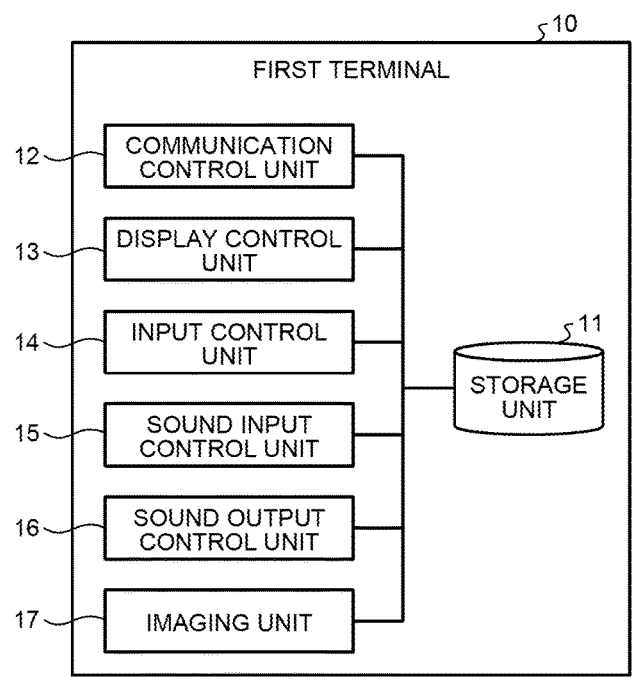
FIG. 2 is a diagram illustrating an example of a functional configuration of a first terminal according to the embodiments.

FIG. 2 is a diagram illustrating an example of a functional configuration of the first terminal 10 according to the embodiments. The first terminal 10 according to the embodiments includes a storage unit 11, a communication control unit 12, a display control unit 13, an input control unit 14, a sound input control unit 15, a sound output control unit 16, and an imaging unit 17.

The storage unit 11 stores information. The information stored in the storage unit 11 is, for example, meeting material information. The meeting material information is information created by, for example, presentation software, word processing software, and spreadsheet software.

The communication control unit 12 controls the communication with other devices connected to the first network 110. The display control unit 13 controls the information to be displayed on a liquid crystal display or so. The input control unit 14 controls the information input from the liquid crystal touch panel or so. The sound input control unit 15 controls the sound information input through a microphone or so. The sound output control unit 16 controls the output of the sound information. The imaging unit 17 images a still image and a moving image.

An example of a configuration of the second terminal 20 according to the embodiments will be explained next.

Figure 3:
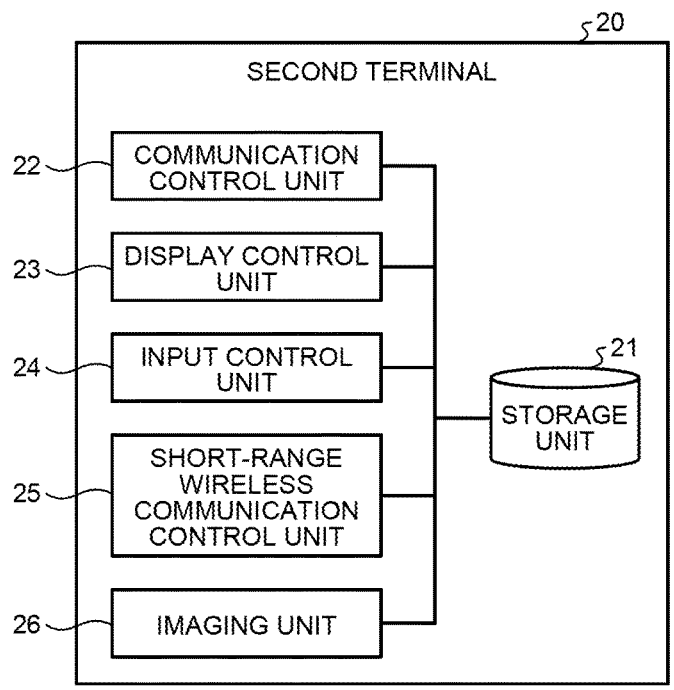
FIG. 3 is a diagram illustrating an example of a functional configuration of a second terminal according to the embodiments.

FIG. 3 is a diagram illustrating an example of a functional configuration of the second terminal 20 according to the embodiments. The second terminal 20 according to the embodiments includes a storage unit 21, a communication control unit 22, a display control unit 23, an input control unit 24, a short-range wireless communication control unit 25, and an imaging unit 26.

The storage unit 21 stores information. The information stored in the storage unit 21 is, for example, relay-device specification information, terminal authentication information, and a mail address.

The relay-device specification information is information for specifying the relay device 40. The relay-device specification information is, for example, an Internet Protocol (IP) address and a Fully Qualified Domain Name (FQDN). When the relay device 40 has the server function for implementing the meeting system, meeting numbers, etc. may further be added as the relay-device specification information.

The terminal authentication information is information used for authentication of the third terminal 30 when the third terminal 30 is connected to the first network 110. The terminal authentication information is, for example, a combination of identification data (ID) and a password. The mail address is an email address used in the third terminal 30.

The communication control unit 22 controls the communication with other devices connected to the first network 110. The communication control unit 22 controls the communication with the third terminal 30 connected to the second network 120. The communication control unit 22 decides a communication scheme between the third terminal 30 and the relay device 40 as the direct scheme or the indirect scheme.

The communication control unit 22 transmits an email including, for example, relay-device authentication information, the terminal authentication information, and communication scheme information to the third terminal 30 through the second network 120. The communication scheme information indicates the direct scheme or the indirect scheme. The communication control unit 22 may transmit the relay-device authentication information, the terminal authentication information, and the communication scheme information to the third terminal 30 using a file server function of the server device 80 on the second network 120.

The display control unit 23 controls the information to be displayed on a liquid crystal panel or so. The input control unit 24 controls the information input from the liquid crystal touch panel or so. The short-range wireless communication control unit 25 receives the relay-device specification information and the terminal authentication information from the relay device 40 through short-range wireless communication such as NFC and BLE. The imaging unit 26 images a still image and a moving image. The moving image represents, for example, the first area 210 in the meeting. The still image is an image representing, for example, the code information displayed on the liquid crystal panel of the relay device 40.

An example of a configuration of the third terminal 30 according to the embodiments will be explained next.

Figure 4:
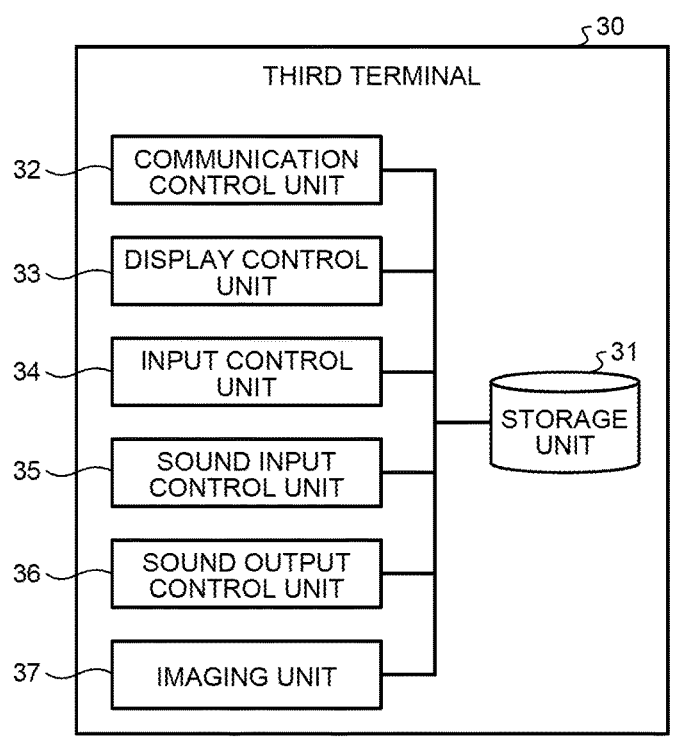
FIG. 4 is a diagram illustrating an example of a functional configuration of a third terminal according to the embodiments.

FIG. 4 is a diagram illustrating an example of a functional configuration of the third terminal 30 according to the embodiments. The third terminal 30 according to the embodiments includes a storage unit 31, a communication control unit 32, a display control unit 33, an input control unit 34, a sound input control unit 35, a sound output control unit 36, and an imaging unit 37.

The storage unit 31 stores information. The information stored in the storage unit 31 is, for example, the meeting material information, the relay-device specification information, and terminal specification information.

The communication control unit 32 controls the communication with the second terminal 20 connected to the second network 120. The communication control unit 32 receives the relay-device authentication information, the terminal authentication information, and the communication scheme information from, for example, the second terminal 20 through the second network 120. The communication control unit 32 transmits the terminal authentication information to the relay device 40 specified by the relay-device specification information through the second network 120 in the communication scheme indicated by the communication scheme information. When the communication scheme information is the indirect scheme, the communication control unit 32 performs peer-to-peer (P2P) communication with the second terminal 20 using, for example, communication application in which the pairing between the second terminal 20 and the third terminal 30 is previously set up.

The display control unit 33 controls the information to be displayed on the liquid crystal display or so. The input control unit 34 controls the information input from the liquid crystal touch panel or so. The sound input control unit 35 controls the sound information input through a microphone or so. The sound output control unit 36 controls the output of the sound information. The imaging unit 37 images a still image and a moving image.

An example of a configuration of the relay device 40 according to the embodiments will be explained next.

Figure 5:
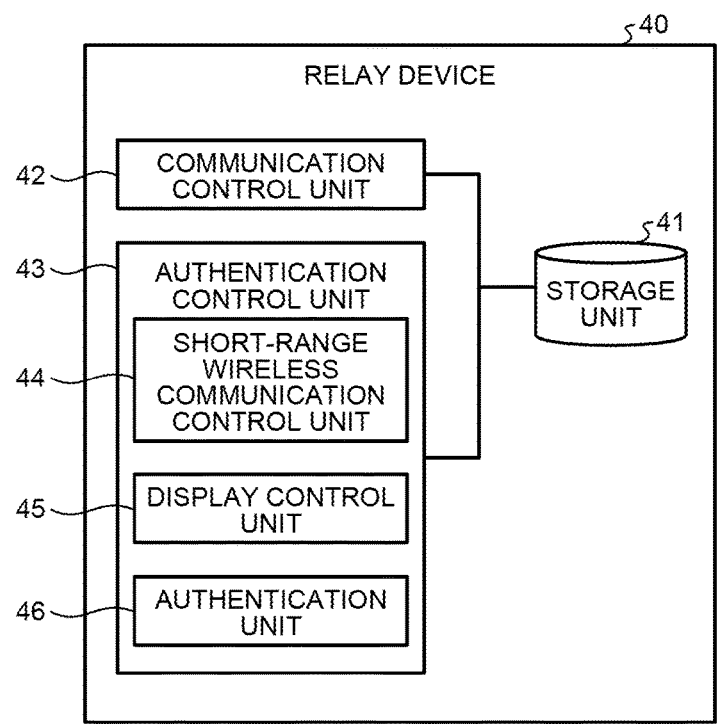
FIG. 5 is a diagram illustrating an example of a functional configuration of a relay device according to the embodiments.

FIG. 5 is a diagram illustrating an example of a functional configuration of the relay device 40 according to the embodiments. The relay device 40 according to the embodiments includes a storage unit 41, a communication control unit 42, and an authentication control unit 43. The authentication control unit 43 includes a short-range wireless communication control unit 44, a display control unit 45, and an authentication unit 46.

The storage unit 41 stores information. The information stored in the storage unit 41 is, for example, the terminal specification information and the relay-device specification information.

Table 1 is a table representing an example of the terminal specification information according to the embodiments.

TABLE 1

| Second Terminal Name | Third Terminal Name | Mail Address | IP Address | ID | Password |
|---|---|---|---|---|---|
| 001a | 001A | xxx@xxx.ne.jp | xxx.xxx.xxx.xxx | 1234 | xyz |
| . | . | . | . | . | . |
| . | . | . | . | . | . |
| . | . | . | . | . | . |

The terminal specification information according to the embodiments includes Second Terminal Name, Third Terminal Name, Mail Address, IP Address, ID, and Password. Second Terminal Name is a name of the second terminal 20. Third Terminal Name is a name of the third terminal 30 associated with the second terminal 20. Mail Address is an address of an email used in the third terminal 30. IP Address is an IP address of the third terminal 30.

ID is identification information used when the third terminal 30 is connected to the first network 110. Password is a password used when the third terminal 30 is connected to the first network 110. Password is, for example, a one-time password that is valid only for a given period of time from the issue. A combination of the ID and the password is used as the terminal authentication information.

The communication control unit 42 controls the communication with other devices connected to the first network 110. When the third terminal 30 is authenticated by the authentication unit 46, the communication control unit 42 controls the communication between the third terminal 30 connected to second network 120 and a device connected to the first network 110.

The short-range wireless communication control unit 44 transmits the relay-device specification information and the terminal authentication information to the second terminal 20 through the short-range wireless communication such as NFC and BLE.

The display control unit 45 performs control for displaying code information on the liquid crystal panel. The code information includes the relay-device specification information and the terminal specification information. The form of the code information may be arbitrary. The code information is, for example, QR code (registered trademark).

The authentication unit 46 authenticates the terminal authentication information received from the third terminal 30 through the second network 120.

An example of a communication method according to the embodiments will be explained next.

Figure 6:
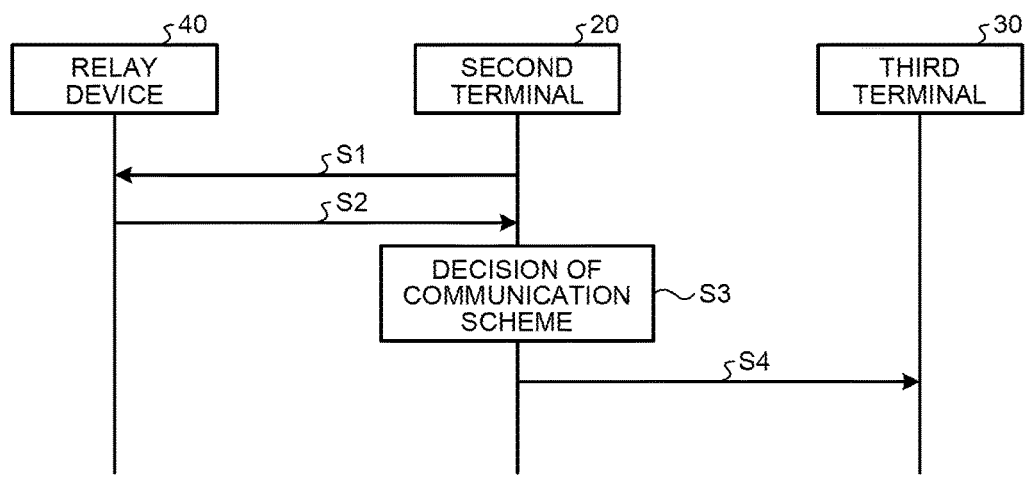
FIG. 6 is a sequence diagram illustrating an example of decision processing of a communication scheme according to the embodiments.

FIG. 6 is a sequence diagram illustrating an example of decision processing of a communication scheme according to the embodiments. First of all, the second terminal 20 transmits an acquisition request for acquiring the relay-device specification information and the terminal authentication information to the relay device 40 (Step S1). At this time, the second terminal 20 transmits information to be stored in the relay device 40 as the second terminal name, the third terminal name, the mail address, and the IP address in the terminal specification information (see Table 1) to the relay device 40.

Then, the relay device 40 transmits the relay-device specification information and the terminal authentication information to the second terminal 20 (Step S2). The terminal authentication information is, for example, the ID and the password.

The processings at Step S1 and Step S2 are performed through the short-range wireless communication such as NFC and BLE. When the second terminal name, the third terminal name, the mail address, the IP address are already stored in the relay device 40, the relay device 40 displays the code information including the terminal authentication information and the second terminal 20 reads the code information, so that the second terminal 20 may acquire the terminal authentication information from the relay device 40.

Subsequently, the second terminal 20 decides the communication scheme between the third terminal 30 and the relay device 40 (Step S3). The example of the processing for deciding the communication scheme at Step S3 will be explained later with reference to FIG. 7

Subsequently, the second terminal 20 transmits an email including the relay-device specification information, the terminal authentication information, and the communication scheme information (direct scheme or indirect scheme) to the third terminal 30 through the second network 120 (Step S4).

An example of the processing (Step S3) for deciding the communication scheme will be explained next.

Figure 7:
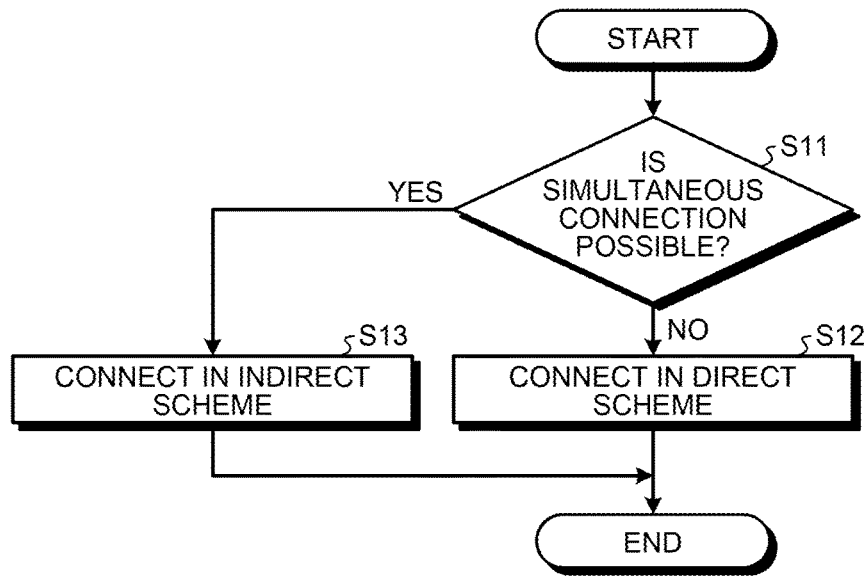
FIG. 7 is a flowchart illustrating an example of the decision processing of the communication scheme according to the embodiments.

FIG. 7 is a flowchart illustrating an example of decision processing of the communication scheme according to the embodiments. First of all, it is determined whether the communication control unit 22 of the second terminal 20 is simultaneously connectable to the third terminal 30 and to the relay device 40 (Step S11). Then, when the communication control unit 22 is not simultaneously connectable to the third terminal 30 and the relay device 40 (No at Step S11), the communication control unit 22 decides the communication scheme between the third terminal 30 and the relay device 40 as the direct scheme (Step S12). The communication control unit 22 is not simultaneously connectable to the third terminal 30 and the relay device 40 when the second terminal 20 is a smartphone, the first network 110 is Wi-Fi (registered trademark), and the second network 120 is a mobile phone network, for example.

When the communication control unit 22 is simultaneously connectable to the third terminal 30 and the relay device 4 (Yes at Step S11), the communication control unit 22 decides the communication scheme between the third terminal 30 and the relay device 40 as the indirect scheme (Step S13). The communication control unit 22 is simultaneously connectable to the third terminal 30 and the relay device 4 when the second terminal 20 is connected to the relay device 40 with a cable and the second network 120 is a mobile phone network, for example.

An example of a communication method of the direct scheme according to the embodiments will be explained next.

Figure 8:
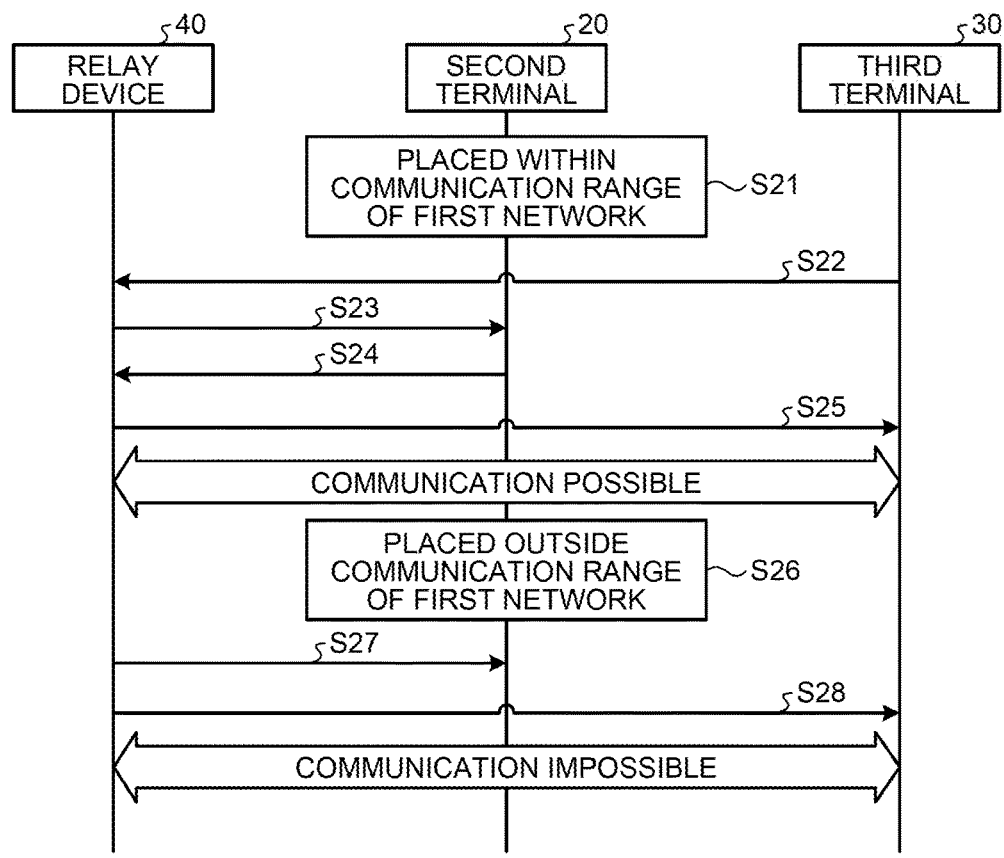
FIG. 8 is a sequence diagram illustrating an example (direct scheme) of a communication method according to the embodiments.

FIG. 8 is a sequence diagram illustrating an example (direct scheme) of the communication method according to the embodiments. First of all, the second terminal 20 is placed within a communication range of the first network 110 (Step S21). Then, the third terminal 30 transmits the terminal authentication information to the relay device 40 through the second network 120 (Step S22). The terminal authentication information is, for example, the ID and the password.

Subsequently, the relay device 40 transmits an inquiry to check whether there is the second terminal 20 within the communication range of the first network 110 to the second terminal 20 through the first network 110 (Step S23). The second terminal 20 then transmits a response to the inquiry at Step S23 to the relay device 40 through the first network 110 (Step S24). Subsequently, when the third terminal 30 can be authenticated by the terminal authentication information received at Step S22, the relay device 40 transmits the response indicating permission to connect to the first network 110 to the third terminal 30 through the second network 120 (Step S25).

Thus, the third terminal 30 can communicate with the first terminal 10, the IWB 50, the projector 60, and the MFP 70, etc. which are connected to the relay device 40 through the first network 110.

The relay device 40 periodically performs the processings at Step S23 and Step S24. Thus, the relay device 40 periodically monitors whether there is the second terminal 20 within the communication range of the first network 110.

Subsequently, the second terminal 20 is placed outside the communication range of the first network 110 (Step S26). The relay device 40 transmits an inquiry to check whether there is the second terminal 20 within the communication range of the first network 110 to the second terminal 20 through the first network 110 (Step S27). When the response to the inquiry transmitted at Step S27 cannot be received within a predetermined period of time, then the relay device 40 transmits a notification indicating the impossibility of connection to the first network 110 to the third terminal 30 through the second network 120, and disconnects the communication (Step S28).

Thus, the third terminal 30 cannot communicate with the first terminal 10, the IWB 50, the projector 60, and the MFP 70, etc. which are connected to the relay device 40 through the first network 110.

An example of a communication method of the indirect scheme according to the embodiments will be explained next.

Figure 9:
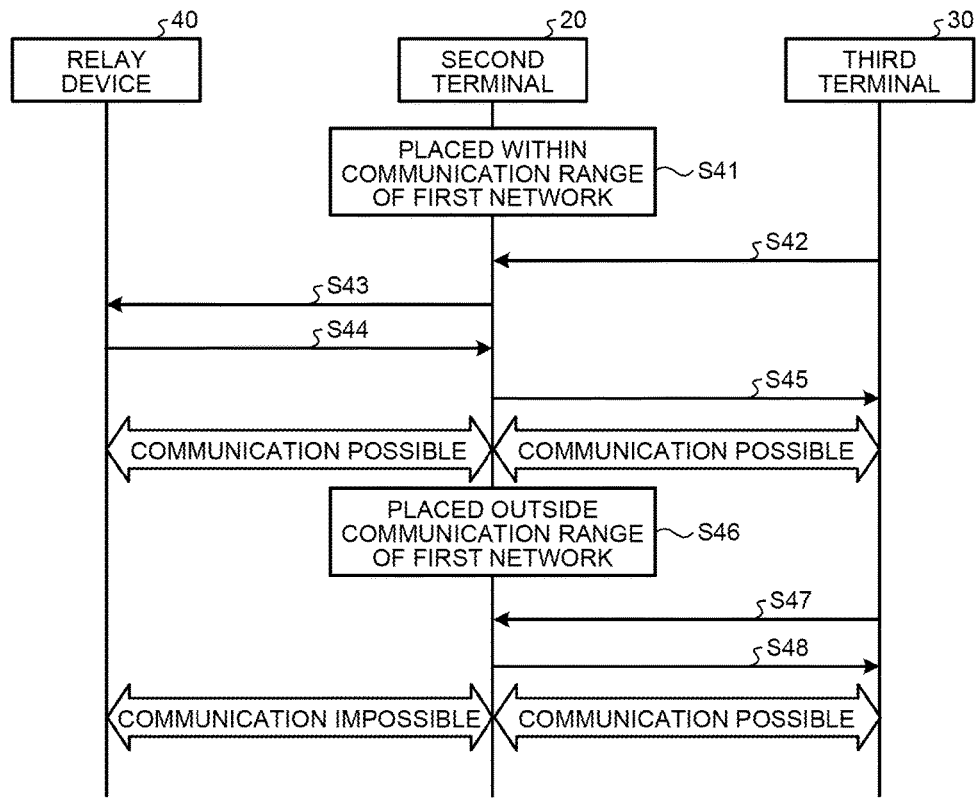
FIG. 9 is a sequence diagram illustrating an example (indirect scheme) of the communication method according to the embodiments.

FIG. 9 is a sequence diagram illustrating an example (indirect scheme) of the communication method according to the embodiments. First of all, the second terminal 20 is placed within the communication range of the first network 110 (Step S41). Then, the third terminal 30 transmits the terminal authentication information addressed to the relay device 40 to the second terminal 20 through the second network 120 (Step S42). The terminal authentication information is, for example, the ID and the password.

Subsequently, the second terminal 20 transmits the terminal authentication information transmitted from the third terminal 30 at Step S42 to the relay device 40 through the first network 110 (Step S43). When the third terminal 30 can be authenticated by the terminal authentication information received at Step S43, the relay device 40 transmits the response indicating the permission of connection to the first network 110 to the second terminal 20 through the first network 110 (Step S44). The second terminal 20 transmits the response transmitted from the relay device 40 at Step S44 to the third terminal 30 through the second network 120 (Step S45).

Thus, the third terminal 30 can communicate with the first terminal 10, the IWB 50, the projector 60, and the MFP 70, etc. which are connected to the relay device 40 through the first network 110.

Subsequently, the second terminal 20 is placed outside the communication range of the first network 110 (Step S46). Then, the third terminal 30 transmits arbitrary information addressed to the first terminal 10 or so connected to the first network 110 to the second terminal 20 through the second network 120 (Step S47). The arbitrary information is, for example, a meeting material and moving images obtained by imaging the user of the third terminal 30 during the meeting. When the arbitrary information transmitted at Step S47 cannot be transmitted to the relay device 40 within a predetermined period of time through the first network 110, the second terminal 20 transmits the notification indicating the impossibility of connection to the first network 110 to the third terminal 30 through the second network 120, and disconnects the communication (Step S48).

Thus, the third terminal 30 cannot communicate with the first terminal 10, the IWB 50, the projector 60, and the MFP 70, etc. which are connected to the relay device 40 through the first network 110.

Lastly, examples of hardware configurations of the first terminal 10, the second terminal 20, the third terminal 30, and the relay device 40 according to the embodiments will be explained below.

Figure 10:
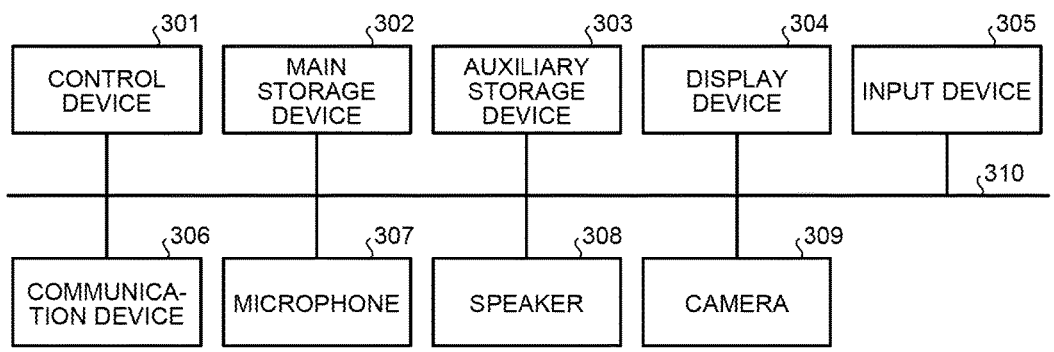
FIG. 10 is a diagram illustrating an example of a hardware configuration of the first terminal and the third terminal according to the embodiments.

FIG. 10 is a diagram illustrating an example of a hardware configuration of the first terminal 10 and the third terminal 30 according to the embodiments. Each of the first terminal 10 and the third terminal 30 according to the embodiments includes a control device 301, a main storage device 302, an auxiliary storage device 303, a display device 304, an input device 305, a communication device 306, a microphone 307, a speaker 308, and a camera 309. The control device 301, the main storage device 302, the auxiliary storage device 303, the display device 304, the input device 305, the communication device 306, the microphone 307, the speaker 308, and the camera 309 are connected to each other via a bus 310.

The control device 301 executes programs read from the auxiliary storage device 303 to the main storage device 302. The main storage device 302 is a memory such as a read-only memory (ROM) and a random access memory (RAM). The auxiliary storage device 303 is a memory card, a solid-state drive (SSD), and so on.

The display device 304 displays information. The display device 304 is, for example, a liquid crystal display. The input device 305 receives an input of information. The input device 305 is, for example, a keyboard and a mouse. The communication device 306 communicates with other devices. The microphone 307 receives a voice input. The speaker 303 outputs a sound. The camera 309 images a still image and a moving image.

The programs executed by the first terminal 10 and the third terminal 30 are provided as a computer program product stored in a computer-readable storage medium such as a compact disk read only memory (CD-ROM), a memory card, a compact disk recordable (CD-R), and a digital versatile disk (DVD) in a file of an installable format or of an executable format.

Moreover, the programs to be executed by the first terminal 10 and the third terminal 30 may be stored on a computer connected to a network such as the Internet and downloaded via the network to provide the programs. In addition, the programs to be executed by the first terminal 10 and the third terminal 30 may be provided via a network such as the Internet without being downloaded.

The programs to be executed by the first terminal 10 and the third terminal 30 may be preinstalled into a ROM or the like to provide the programs.

The programs to be executed by the first terminal 10 and the third terminal 30 have a module configuration including functions that can be implemented by the programs, in the functional configurations (see FIG. 2 and FIG. 4) of the first terminal 10 and the third terminal 30 according to the embodiments.

The control device 301 executes the programs read from the storage medium such as the auxiliary storage device 303 and thereby the functions to be implemented by the programs are loaded into the main storage device 302. In other words, the functions executed by the programs are generated on the main storage device 302.

Part or all of the functions of the first terminal 10 and the third terminal 30 according to the embodiments may be implemented by hardware such as an integrated circuit (IC).

Figure 11:
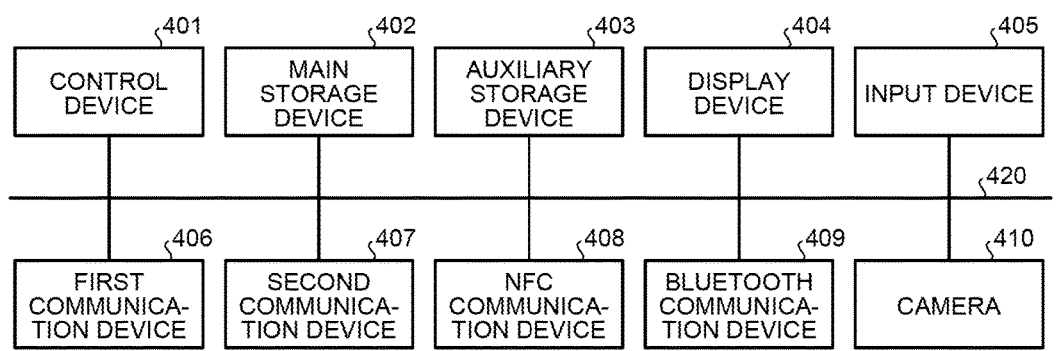
FIG. 11 is a diagram illustrating an example of a hardware configuration of the second terminal according to the embodiments.

FIG. 11 is a diagram illustrating an example of a hardware configuration of the second terminal 20 according to the embodiments. The second terminal 20 according to the embodiments includes a control device 401, a main storage device 402, an auxiliary storage device 403, a display device 404, an input device 405, a first communication device 406, a second communication device 407, an NFC communication device 408, a Bluetooth (registered trademark) communication device 409, and a camera 410. The control device 401, the main storage device 402, the auxiliary storage device 403, the display device 404, the input device 405, the first communication device 406, the second communication device 407, the NFC communication device 408, the Bluetooth (registered trademark) communication device 409, and the camera 410 are connected to each other via a bus 420.

The control device 401, the main storage device 402, and the auxiliary storage device 403 are respectively the same as the control device 301, the main storage device 302, and the auxiliary storage device 303 (see FIG. 10), and therefore the descriptions thereof are omitted.

The display device 404 and the input device 405 are devices such as a liquid crystal panel having an information display function and an information input function. The first communication device 406 is a device that performs communication through the first network 110. The first communication device 406 is, for example, a wireless LAN adapter. The second communication device 407 is a device that performs communication through the second network 120. The second communication device 407 is, for example, a 3G communication module. The NFC communication device 408 is a device that performs transmission/reception of information through NFC. The Bluetooth (registered trademark) communication device 409 is a device that performs transmission/reception of information through BLE. The camera 419 images a still image and a moving image.

The programs executed by the second terminal 20 are provided as a computer program product stored in a computer-readable storage medium such as a CD-ROM, a memory card, a CD-R, and a DVD in a file of an installable format or of an executable format.

Moreover, the programs to be executed by the second terminal 20 may be stored on a computer connected to a network such as the Internet and downloaded via the network to provide the programs. In addition, the programs to be executed by the second terminal 20 may be provided via a network such as the Internet without being downloaded.

The programs to be executed by the second terminal 20 may be preinstalled into a ROM or the like to provide the programs.

The programs to be executed by the second terminal 20 have a module configuration including functions that can be implemented by the programs, in the functional configuration (see FIG. 3) of the second terminal 20 according to the embodiments.

The control device 401 executes the programs read from the storage medium such as the auxiliary storage device 403 and thereby the functions to be implemented by the programs are loaded into the main storage device 402. In other words, the functions executed by the programs are generated on the main storage device 402.

Part or all of the functions of the second terminal 20 according to the embodiments may be implemented by hardware such as an IC.

Figure 12:
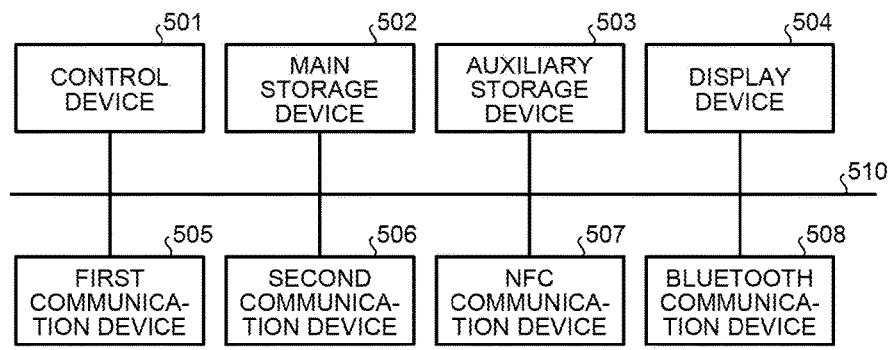
FIG. 12 is a diagram illustrating an example of a hardware configuration of the relay device according to the embodiments.

FIG. 12 is a diagram illustrating an example of a hardware configuration of the relay device 40 according to the embodiments. The relay device 40 according to the embodiments includes a control device 501, a main storage device 502, an auxiliary storage device 503, a display device 504, a first communication device 505, a second communication device 506, an NFC communication device 507, and a Bluetooth (registered trademark) communication device 508. The control device 501, the main storage device 502, the auxiliary storage device 503, the display device 504, the first communication device 505, the second communication device 506, the NFC communication device 507, and the Bluetooth (registered trademark) communication device 508 are connected to each other via a bus 510.

The control device 501, the main storage device 502, and the auxiliary storage device 503 are respectively the same as the control device 301, the main storage device 302, and the auxiliary storage device 303 (see FIG. 10), and therefore the descriptions thereof are omitted. The display device 504 is a device such as a liquid crystal panel having a display function of information.

The first communication device 505, the second communication device 506, the NFC communication device 507, and the Bluetooth (registered trademark) communication device 508 are respectively the same as the first communication device 406, the second communication device 407, the NFC communication device 408, and the Bluetooth (registered trademark) communication device 409 (see FIG. 11), and therefore the descriptions thereof are omitted.

The programs executed by the relay device 40 are provided as a computer program product stored in a computer-readable storage medium such as a CD-ROM, a memory card, a CD-R, and a DVD in a file of an installable format or of an executable format.

Moreover, the programs to be executed by the relay device 40 may be stored on a computer connected to a network such as the Internet and downloaded via the network to provide the programs. In addition, the programs to be executed by the relay device 40 may be provided via a network such as the Internet without being downloaded.

The programs to be executed by the relay device 40 may be preinstalled into a ROM or the like to provide the programs.

The programs to be executed by the relay device 40 have a module configuration including functions that can be implemented by the programs, in the functional configuration (see FIG. 5) of the relay device 40 according to the embodiments.

The control device 501 executes the programs read from the storage medium such as the auxiliary storage device 503 and thereby the functions to be implemented by the programs are loaded into the main storage device 502. In other words, the functions executed by the programs are generated on the main storage device 502.

Part or all of the functions of the relay device 40 according to the embodiments may be implemented by hardware such as an IC.

As explained above, in the communication system 100 according to the embodiments, the second terminal 20 transmits, when receiving the relay-device specification information and the terminal authentication information from the relay device 40, the received relay-device specification information and terminal authentication information to the third terminal 30 through the second network 120. When the terminal authentication information received from the third terminal 30 through the second network 120 is authenticated by the authentication control unit 43, the communication control unit 42 of the relay device 40 connects the third terminal 30 to the first network 110.

According to the communication system 100 of the embodiments, when the second terminal 20 is in a range where the second terminal 20 can communicate with the relay device 40, the third terminal 30 can be connected to the first network 110. Thus, according to the communication system 100 of the embodiments, secure communication can be more easily established between a device placed in a location where a meeting is held and a device, such as a device of a home-based worker, not placed in the location where the meeting is held.

According to an embodiment, it is possible to more easily establish secure communication between a device placed in a location where a meeting is held and a device not placed in the location where the meeting is held.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication system comprising:
   a relay device configured to control communication of a first network;
   one or more first terminals connected to the first network;
   a second terminal, amongst the one or more first terminals, connectable to the first network and connectable to a second network; and
   a third terminal connectable to the second terminal through the second network,
   the relay device including:
      a storage unit configured to store terminal specification information for specifying the third terminal associated with the second terminal;
      a transmission unit configured to transmit relay-device specification information for specifying the relay device and terminal authentication information of the third terminal to the second terminal through the first network;
      an authentication control unit configured to authenticate the terminal authentication information received from the third terminal through the second network; and
      a first communication control unit configured to connect the third terminal to the first network if the authentication control unit authenticates the terminal authentication information,
   the second terminal including a second communication control unit configured to transmit the relay-device specification information and the terminal authentication information to the third terminal through the second network if receiving the relay-device specification information and the terminal authentication information from the relay device,
   the third terminal including a third communication control unit configured to transmit the terminal authentication information to the relay device specified by the relay-device specification information through the second network.

2. The communication system according to claim 1, wherein
   the first communication control unit is configured to:
      periodically transmit an inquiry to check whether the second terminal is within a communication range of the first network; and
      disconnect communication between the relay device and the third terminal if not receiving a response to the inquiry from the second terminal within a predetermined period of time.

3. The communication system according to claim 1, wherein,
   the first communication control unit is configured to connect the third terminal to the first network through the second terminal if the authentication control unit authenticates the terminal authentication information received from the second terminal through the second network, and
   the second communication control unit is configured to:
      transmit the relay-device specification information and the terminal authentication information to the third terminal through the second network if receiving the relay-device specification information and the terminal authentication information from the relay device; and
      transmit the terminal authentication information to the relay device if receiving the terminal authentication information from the third terminal.

4. The communication system according to claim 3, wherein the second communication control unit is configured to disconnect communication between the relay device and the third terminal through the second terminal if receiving information addressed to the first terminal from the third terminal and being unable to transmit the information addressed to the first terminal to the relay device within a predetermined period of time.

5. The communication system according to claim 1, wherein,
   the second communication control unit is configured to:
      determine whether the second terminal is simultaneously connectable to the first network and to the second network if receiving the relay-device specification information and the terminal authentication information from the relay device,
      transmit communication scheme information indicating an indirect scheme of connecting the relay device and the third terminal through the second terminal, along with the relay-device specification information and the terminal authentication information to the third terminal if the second terminal is simultaneously connectable to the first network and to the second network, and transmit communication scheme information indicating a direct scheme of connecting the relay device and the third terminal without using the second terminal, along with the relay-device specification information and the terminal authentication information to the third terminal if the second terminal is not simultaneously connectable to the first network and to the second network, and the third communication control unit is configured to transmit the terminal authentication information to the relay device specified by the relay-device specification information through the second network in a communication scheme indicated by the communication scheme information.

6. The communication system according to claim 1, wherein the transmission unit is configured to transmit the relay-device specification information and the terminal authentication information to the second terminal over wireless communication, and the second terminal includes a wireless communication control unit configured to receive the relay-device specification information and the terminal authentication information over wireless communication.

7. The communication system according to claim 1, wherein the authentication control unit is configured to display code information including the relay-device specification information and the terminal authentication information, and the second terminal further includes an imaging unit configured to image the code information.

8. A relay device configured to control communication of a first network to which each of one or more first terminals and a second terminal amongst the one or more first terminals is connectable, and communication on a second network through which the second terminal is connectable to a third terminal, the relay device comprising:

a storage unit configured to store terminal specification information for specifying the third terminal associated with the second terminal;

a transmission unit configured to transmit relay-device specification information for specifying the relay device and terminal authentication information of the third terminal to the second terminal through the first network;

an authentication control unit configured to authenticate the terminal authentication information if receiving the terminal authentication information transmitted to the third terminal through the second network by the second terminal, from the third terminal through the second network; and a first communication control unit configured to connect the third terminal to the first network if the authentication control unit authenticates the terminal authentication information.

9. The relay device according to claim 8, wherein the first communication control unit is configured to:

periodically transmit an inquiry to check whether the second terminal is within a communication range of the first network; and disconnect communication between the relay device and the third terminal if not receiving a response to the inquiry from the second terminal within a predetermined period of time.

10. The relay device according to claim 8, wherein the first communication control unit is configured to connect the third terminal to the first network through the second terminal if the authentication control unit authenticates the terminal authentication information received from the second terminal through the second network.

11. The relay device according to claim 8, wherein the transmission unit is configured to transmit the relay-device specification information and the terminal authentication information to the second terminal over wireless communication.

12. The relay device according to claim 8, wherein the authentication control unit is configured to display code information including the relay-device specification information and the terminal authentication information.

13. An information processing device connectable to a relay device configured to control communication of a first network to which each of one or more internal terminals including the information processing device is connected and control, through the first network, communication of a second network to which each of an external terminal and the information processing device is connectable, the information processing device comprising:

a first transmission unit configured to, if receiving relay-device specification information for specifying the relay device and terminal authentication information of the external terminal from the relay device through the first network, transmit the relay-device specification information and the terminal authentication information to the external terminal through the second network;

a second transmission unit configured to transmit the terminal authentication information to the relay device through the first network if receiving the terminal authentication information transmitted by the first transmission unit, from the external terminal through the second network; and a determining unit configured to determine whether the information processing device is simultaneously connectable to the first network and to the second network if receiving the relay-device specification information and the terminal authentication information from the relay device, the first transmission unit being configured to:

transmit communication scheme information indicating an indirect scheme of connecting the relay device and the external terminal through the information processing device, along with the relay-device specification information and the terminal authentication information to the external terminal if the determining unit determines that the information processing device is simultaneously connectable to the first network and to the second network; and transmit communication scheme information indicating a direct scheme of connecting the relay device and the external terminal without using the information processing device, along with the relay-device specification information and the terminal authentication information to the external terminal if the determining unit determines that the information processing device is not simultaneously connectable to the first network and to the second network.

14. The information processing device according to claim 13, further comprising a communication control unit configured to disconnect communication between the relay device and the external terminal through the information processing device if information addressed to the internal terminal is received from the external terminal and the information addressed to the internal terminal cannot be transmitted to the relay device within a predetermined period of time.

15. The information processing device according to claim 13, further comprising a wireless communication control unit configured to receive the relay-device specification information and the terminal authentication information over wireless communication.

16. The information processing device according to claim 13, further comprising an imaging unit configured to image code information including the relay-device specification information and the terminal authentication information displayed by the relay device.

* * * * *